April 1, 1969     P. H. MOYER     3,435,477

DENTAL APPLIANCE

Filed June 13, 1966     Sheet 1 of 2

INVENTOR

Paul H. Moyer

BY Ayates Dowell &
Ayates Dowell Jr.

ATTORNEYS

April 1, 1969 P. H. MOYER 3,435,477
DENTAL APPLIANCE
Filed June 13, 1966 Sheet 2 of 2
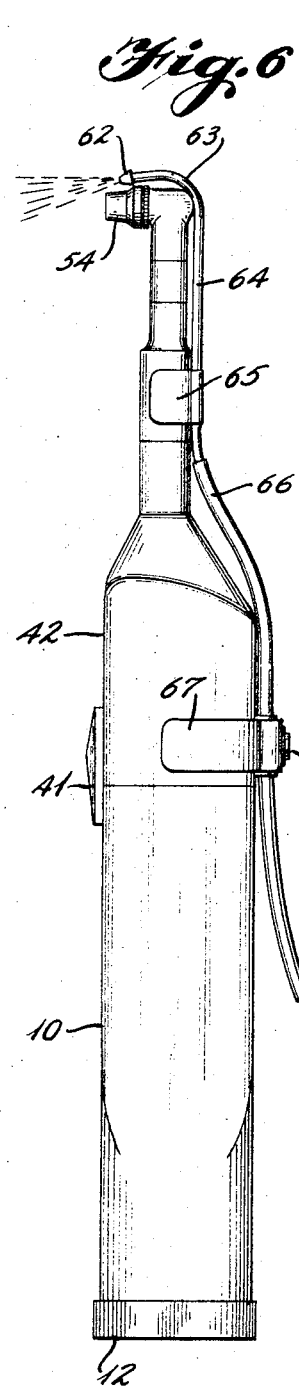
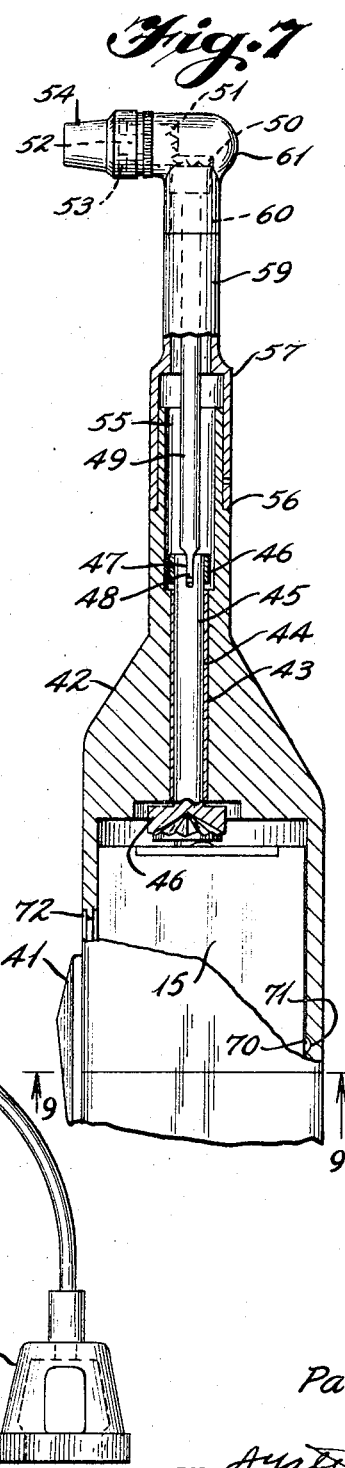
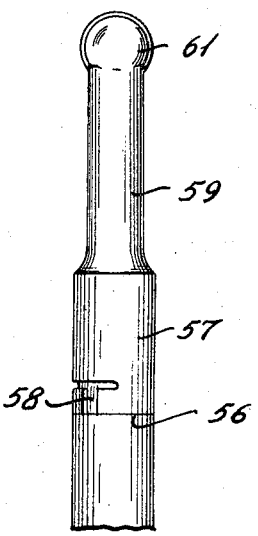
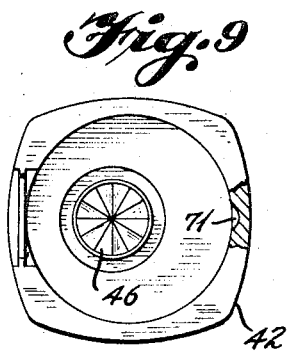
INVENTOR
Paul H. Moyer
BY
ATTORNEYS 3,435,477
DENTAL APPLIANCE
Paul H. Moyer, 1112 Berwyn Road,
Orlando, Fla. 32806
Filed June 13, 1966, Ser. No. 556,973
Int. Cl. A47l 25/00, 21/02; A61h 7/00
U.S. Cl. 15—22                                                        10 Claims

ABSTRACT OF THE DISCLOSURE

Apparatus for treating the teeth in which a handle or casing is adapted to accommodate a plurality of head structures each of which has a dental treatment device. In one of the head structures the dental treatment device is adapted to oscillate to brush the teeth and in another head structure the dental treatment device is adapted to rotate to treat the gums.

---

This invention relates to dental appliances and has for its object the provision of a dental appliance capable of performing multiple operations including brushing the teeth, massaging the gums and cleaning heavy tartar and stain as a dentist would do when you get a prophylaxis, such dental appliance having power means for actuating the operating portions of the device with a source of power either self-contained or outside with an electrical connection thereto.

Another object of the invention is to provide a relatively compact and portable dental appliance which can be readily held in the hand, is usable in the home, to selectively provide oscillatory or rotary motion for the treatment of the teeth and gums, and optionally with an attached fluid supply for an antiseptic, a mouth wash, or water for tooth and gum therapy and removing heavy tartar and stain.

Another object of the invention is to provide a relatively simple, practical, inexpensive, dental appliance, having a drive unit such as a motor, a brushing unit, and a massaging and cleaning unit of selective utensils, and power transmission means for driving such interchangeable brushing, massaging and cleaning units from said driving unit.

Another object of the invention is to provide a basic unit with relatively simple interchangeable, quickly attachable and detachable heads for performing the various operations on the gums and teeth.

Figure 1:
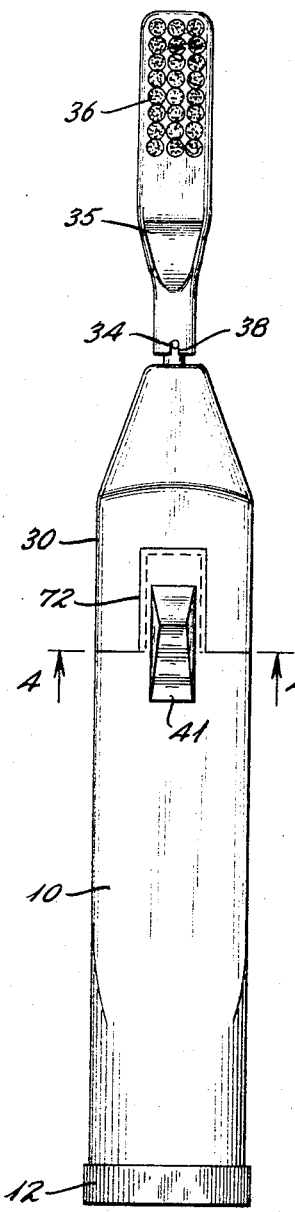
Figure 2:
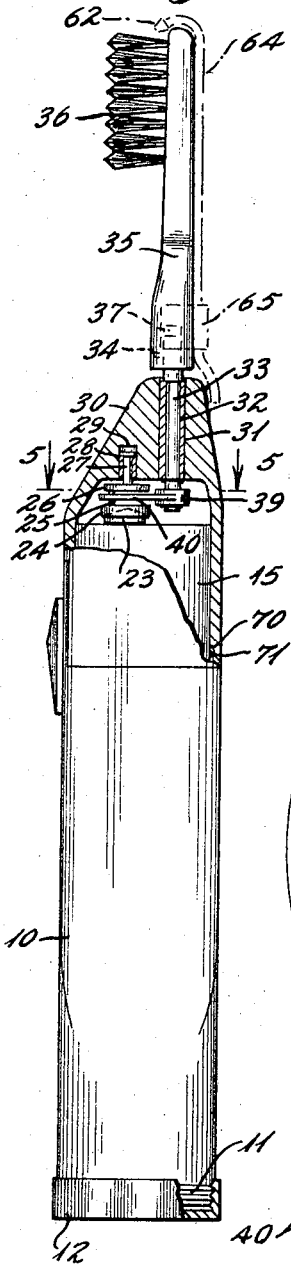
Figure 3:
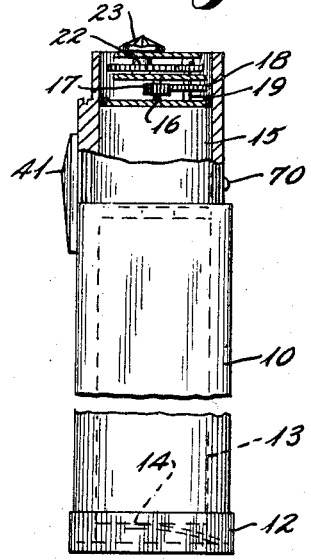
Figure 4:
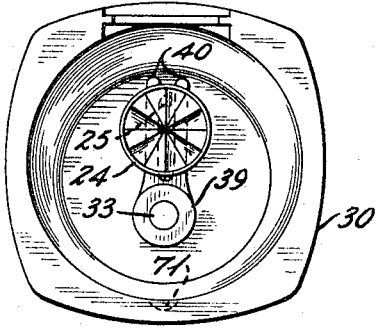
Figure 5:
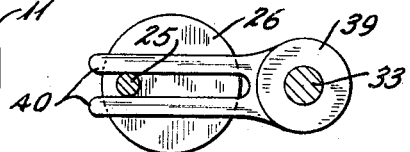

Other objects and advantages of the invention will be apparent from the following description considered in connection with the accompanying drawings wherein:

FIG. 1 is a side elevation illustrating one application of the invention;

FIG. 2, a similar view at right angles to FIG. 1 with parts broken away to reveal the motor and the structure for oscillating the brush;

FIG. 3, a side elevation of the base unit apart from the operating heads with parts broken away to illustrate its construction;

FIG. 4, a transverse section on the line 4—4 of FIG. 1;

FIG. 5, a transverse section through the drive on the line 5—5 of FIG. 2;

FIG. 6, a side elevation of a rotary cleaning and massage or treatment attachable and detachable head with an attached fluid spraying tube and a control valve therefor;

FIG. 7, an enlarged view of one of the operating heads of FIG. 6 with its major portion in longitudinal section revealing the driving mechanism;

FIG. 8, a fragmentary view of the portion of the spray head of FIGS. 6 and 7 viewed from the right in FIG. 7; and, FIG. 9, a transverse section on the line 9—9 of FIG. 7.

With continued reference to the drawings the portable dental appliance of the present invention comprises a generally cylindrical handle 10 adapted to be gripped in the hand while the device is used. This handle preferably is hollow and may have threads 11 about one end for the receipt of an internally threaded and externally knurled cap 12, the cap being easily applied and removed by means of the external knurling which facilitates manual gripping. The handle 10 forming a casing or base may contain batteries 13 operatively pressed or positioned together by a spring 14, or be connected to some other source of power, for driving a motor 15 therein having a shaft 16 carrying a gear 17 which drives a larger gear 18 lying on a shaft 19 on which is carried a substantially smaller gear 20 which in turn drives a substantially larger gear 21 which drives a shaft 22 carrying a coupling member 23 disposed in off-centered relation to the casing. The coupling member 23 is designed to engagingly drive and provide bearing support for a complementary coupling member in a particular head, an open-end head closing the other end of the casing, different types of heads being adaptable for use with the casing 10. As an illustration of the types of heads used in FIGS. 1 and 2, the complementary adapter or coupling 24 therein has one end of an eccentric crank pin 25 attached thereto and its other end securely supported by a disk 26 having a concentric stub shaft 27 supported in a bearing 28 mounted in a socket 29 of the operating head 30. The operating head 30 has a bore 31 in which is mounted a bearing 32 through which extends a shaft 33 projecting from the head 30 and having a guide pin 34. On the projecting end is adapted to be received a toothbrush 35 of a conventional character having bristles 36, such toothbrush having a cavity 37 and a slot 38 in which the end of the shaft 33 and the pin 34 are nonrotatably received, thus providing for the mounting of interchangeable brushes.

In order to oscillate the bristles of the brush the end portion of the shaft 33 has fixed thereon a yoke 39 having parallely spaced prongs or bifurcations 40 between which the crank pin 25 is slidably received. Since the crank pin 25 is off-center of shaft 22 and the coupling member 24 as it rotates, the yoke 39 fixed to the shaft 33 will be forced to oscillate. It will be apparent from the foregoing that in order to oscillate the shaft 33 power will be derived from the batteries 13 contained within the handle 10 or from some other source of power subject to the control of a thumb swicth 41.

Instead of an oscillating head as illustrated in FIGS. 1 and 2, a different type of head 42, as shown in FIG. 7, may be provided having a central axial bore 43 with an antifriction liner or bearing 44 which is mounted on shaft 45 having a coupling member 46 complementary to the adapter or coupling member 23 on one end of the shaft 45 and with the other end of the shaft provided with a retaining collar 46 and a slot 47 which receives therein a flat extremity 48 of a shaft 49 having a pinion gear 50 which drives a complementary pinion gear 51 on a shaft 52 on which is carried a button type head 53 for the removal or reception thereon of any desired type of tool such as for example a rotary cup type massage unit 54 preferably of relatively soft elastic material for use in massaging the gums. The head 42 is provided with a portion of reduced diameter forming an extremity 55 at the base of which is a shoulder 56. On such reduced portion and against such shoulder fits a sleeve 57 having a T-slot 58 to provide sufficient springiness to the sleeve 57 so that by the clamping action thereof onto the head portion 55 the sleeve is retained thereon. The sleeve 57 has a hollow extension 59 which forms an end housing for the shaft 49. The housing 59 has a reduced externally threaded extension 60 on which is received a dental tool carrying elbow 61, the parts thus described providing a finished appearance corresponding to that of a conventional dental tool with a right-angular operation portion.

The invention provides for the supplying of a rinse or wash to be applied to the gums or teeth during the use of either the oscillating brush or the rotary head, as seen in dotted lines in FIG. 2 and full lines in FIG. 6. In order to provide for the supply of such rinse or wash, a discharge nozzle 62 may be mounted on a curved extremity 63 of a supply tube 64 adapted to be attached by means of a spring clamp 65 to the sleeve 57 or brush 35. The tube 64 may also have a supply tube 66 of plastic or rubber and may be held by another spring clip 67 while the end of the tube may have a connection 68 for attachment to a source of water supply such as the bathroom faucet, thus the tubes 64 and 66 may be held in streamlined contact with the discharge 62 in close intimacy to the massage unit or brushing head.

In connection with the tube 66 a spring-loaded valve 69 may be provided for controlling the supply of fluid therethrough, such valve being in a convenient position for actuation by the forefinger of the person using the device.

The base and head may be frictionally engaged and the base may have a detent 70 for interlocking reception in a recess 71, thus providing a quick attachment or detachment therebetween without the use of tools.

The thumb switch 41 is carried by the base 10, such base having an extension 72 forming a support for the switch 41 and having a groove along the two parallel edges at the end of the same in which the complementary reduced portions of the head are adapted to be received when the parts are in similar relation.

It will be apparent from the foregoing that a relatively simple dental appliance is provided having a hollow handle which is to be driven from a suitable source of electrical energy such as, for example, a dry cell battery or rechargeable cell, or conventional connection into a source of electrical energy.

To the base unit is adapted to be applied a suitable head such as, for example, the oscillatable brush of FIGS. 1 and 2 with suitable driving means therefor or the rotary relatively soft cleaning and massage element of FIGS. 5 and 7 with or without an attached fluid supply, the motor having a shaft with a frusto-conical driving gear coupling member having complementary engagement for the driven gear and including a driving connection through the particular brush to be used to oscillate the same, or a rotary cleaning and massage element which is continually rotated by a connection providing continued rotation thereof, all controls subject to a switch on the handle in a convenient location to be operated by the thumb with the fluid spray provided with a control available in the same general area but circumferentially spaced from the electrical control.

It will be obvious to one skilled in the art that various changes may be made in the invention without departing from the spirit and scope thereof and therefore the invention is not limited by that which is illustrated in the drawings and described in the specification, but only as indicated in the accompanying claims.

What is claimed is:

1. In a portable dental hygienic appliance of the character described comprising:
    an elongated casing structure of generally circular section including closure means at one end thereof,
    said elongated casing structure being of a size and configuration to form a handle adapted to be readily held in the hand of a user of the appliance,
    a motor mounted in said casing structure and means for driving said motor,
    said motor including drive shaft means extending therefrom at the opposite end of said casing structure and disposed in off-centered relation thereto,
    a head structure having an open end detachably mounted on said casing structure with said open end of the head structure closing said opposite end of the casing structure,
    driven shaft means mounted in said head structure to be actuated by said motor drive shaft means,
    coupling means comprising a complementary coupling member carried respectively by each of said drive and driven shaft means,
    said coupling members being positioned for interengagement with each other when said head structure is mounted in closing position on said casing structure,
    positioning means on said casing and head structures to effect alignment of said complementary coupling members when said head structure is mounted in closing position on said casing structure,
    said alignment positioning means comprising a parallel sided lug extension on said opposite end of said casing structure and engaged within a complementary shaped recess in said head structure,
    means for releasably securing said head structure on said casing structure in coupling-engaged position,
    dental treatment means carried by said head structure and detachably connected to said driven shaft means therein,
    and manually operable means for controlling said motor mounted on said casing structure at a location for convenient actuation by a portion of the operator's hand during use of the dental appliance.

2. In a portable dental hygienic appliance as defined in claim 1 wherein said motor comprises an electric motor,
    said manually operable motor-controlling means comprising an electrical switch mounted on and supported by said parallel-sided lug extension.

3. In a portable dental hygienic appliance as defined in claim 1 wherein said driven shaft means in said head structure is positioned in axial alignment with said complementary drive and driven coupling members,
    said head structure having a tubular extension thereon at its opposite end in alignment with said driven shaft means therein,
    said dental treatment means comprising a treatment device driven by said motor including a housing and having a tubular extension thereon complementary to said tubular extension of said head structure frictionally and detachably mounted in telescopic relation thereon,
    and means to frictionally secure the housing of said dental treatment means in operative position on the tubular extension of said head structure.

4. In a portable dental hygienic appliance as defined in claim 3 wherein said driven shaft means in said head structure includes a shaft having an end portion extending into said tubular extension of the head structure,
    said tubular extension of said dental treatment means including a rotatable shaft mounted therein,
    and a complementary coupling element on the adjacent ends of each of the shafts mounted in said tubular extensions,
    said last mentioned complementary coupling elements being inter-engageable when the tubular extension of the housing of the dental treatment means is mounted in telescopic-engaged position on the tubular extension of said head structure.

5. In a portable dental hygienic appliance as defined in claim 1 wherein said driven shaft means in said head structure includes a first shaft rotatably supported at one end thereof within the open end of said head structure,
    said last-mentioned shaft mounting one of said complementary coupling members at the opposite end thereof and including an eccentric member intermediate the length thereof,
    said driven shaft means in said head structure including a second shaft journaled therein, yoke means secured on one end of said second shaft within said open end of said head structure and engaging said eccentric member whereby rotation of said first shaft coupled to said motor shaft means in said casing structure oscillates said second shaft, said dental treatment device being detachably secured on the opposite end of said second shaft journaled in said head structure.

6. In a portable dental hygienic appliance as defined in claim 1 wherein said head structure includes means for converting the rotary motion transmitted from said motor drive shaft means to said driven shaft means through said coupling means into oscillating motion whereby to oscillate said dental treatment device about its own axis, said driven shaft means including a shaft member rotatably supported solely at one end in said head structure, one said complementary coupling member being mounted on the opposite end thereof and interengaged with the other of said complementary coupling members, whereby said other complementary coupling member provides a bearing support therefor.

7. In a portable dental hygienic appliance as defined in claim 1 herein said casing structure is generally of cylindrical configuration, said driven shaft means in said head structure includes a pair of rotatably mounted shafts mounted therein disposed substantially parallel to the axis of the cylindrical casing structure, said complementary driven coupling member being mounted on the end of one of said driven shafts to effect rotation thereof from said motor-driven drive shaft means in said casing structure, and means within said head structure converting the rotary motion of said one shaft of said pair of shafts to an oscillatory motion of the other of said pair of shafts to impart a corresponding oscillatory motion to said dental treatment means detachably carried thereby.

8. In a portable dental hygienic appliance as defined in claim 1 wherein said driven shaft means in said head structure comprises a pair of parallelly disposed shaft members journaled therein, one of said shaft members being rotatably mounted solely at one end thereof, said complementary coupling member of said driven shaft means being mounted on the opposite end of said one shaft member, an eccentric crank pin mounted on said one of said shaft members intermediate the length thereof, said dental treatment device being detachably mounted on the other of said shaft members, a yoke member mounted on said other of said shaft members and extending transversely thereof into sliding engagement with said eccentric crank pin means on said one shaft member whereby rotation of said one shaft by said motor in said casing structure effects oscillation of said other shaft member and the dental treatment means carried thereby.

9. In a portable dental hygienic appliance as defined in claim 1 wherein said dental appliance includes a fluid supply tube mounted thereon, means for securing said fluid supply tube on said appliance, said tube including valve means therein for controlling flow of fluid therethrough, said valve means being located in a position on said casing structure for convenient actuation by the hand of the operator adapted to support and control the appliance, said tube having means thereon to detachably connect one end thereof to a source of fluid supply, said tube having discharge nozzle means at its opposite end positioned adjacent said dental treatment means for effective cooperation therewith.

10. A portable dental hygienic appliance comprising an elongated handle forming casing, a drive shaft rotatably mounted within said casing and projecting from one end thereof, means for rotating said drive shaft, a first coupling member mounted on said drive shaft exteriorly of said casing, said first coupling member having a serrated generally conical surface on the side remote from said casing, multiple head structures interchangeably mounted one at a time on said casing, each of said head structures having a portion adapted to frictionally engage a portion of said casing and form an extension thereof, a driven shaft rotatably mounted within each head structure, a second coupling member mounted on each of said driven shafts, said second coupling member having a serrated inverted generally conical surface complementarily engaging the conical surface of said first coupling member when one of the head structures is mounted on said casing, dental treatment means connected to the driven shaft of each head structure, and said dental treatment means of each head structure being different from the dental treatment means of another head structure, whereby multiple dental treatment means can be selecively mounted on said casing and driven by said drive shaft.

References Cited

UNITED STATES PATENTS

| 2,124,145 | 7/1938 | Merkel | 15—23 |
| 2,808,602 | 10/1957 | Gregoire | 15—28 |
| 3,220,039 | 11/1965 | Dayton et al. | 15—28 |
| 2,601,567 | 6/1952 | Steinberg | 15—22 |

FOREIGN PATENTS

| 1,236,103 | 6/1960 | France. |
| 555,481 | 7/1932 | Germany. |

EDWARD L. ROBERTS, *Primary Examiner.*

U.S. Cl. X.R.

15—28; 128—62